Patented Dec. 3, 1946

2,411,962

UNITED STATES PATENT OFFICE 2,411,962

CATALYST AND PROCESS FOR THE PRODUCTION OF VINYL ESTERS

William Vance Freed, Wilmington, Del., assignor to E. I. du Pont de Nemours & Company, Wilmington, Del., a corporation of Delaware No Drawing. Application July 28, 1943, Serial No. 496,476

6 Claims. (Cl. 260—498)

This invention relates to the preparation, by a catalytic process, of vinyl esters of organic acids and specifically to the preparation of vinyl acetate.

Vinyl esters of organic acids have assumed an increasingly important role in the synthetic polymer field owing to the ease with which they undergo transformation to resins, polymers, and other products of commercial utility. The most widely used method of obtaining a vinyl ester consists in the liquid phase condensation of acetylene and a carboxylic acid in the presence of such catalysts as mercury sulfate and phosphate. These processes, however, are, for the most part, inefficient in producing high conversions to the vinyl ester due to the formation of by-products at the expense of the vinyl ester and are not generally applicable to the production of esters of higher acids. Vapor phase methods using metallic salts supported on charcoal as catalysts have the disadvantages of relatively short catalyst life and unfavorable yield due to a secondary reaction between acetylene and the vinyl ester to form the ethylidene ester as a by-product.

The invention has as an object a new process for the preparation of vinyl esters. Another object of the invention is to provide a new catalytic process for preparing vinyl esters of carboxylic acids with minimum formation of by-products and maximum yields. A further object is the suppression of by-product formation in the catalytic vapor phase production of vinyl esters from acetylene and carboxylic acids. A specific object is to provide a new catalytic process for preparing vinyl acetate with minimum by-product formation and maximum yields. Other objects will appear hereinafter.

These objects are accomplished by the following invention wherein vinyl esters are produced by admixing acetylene and a carboxylic acid and heating the mixture in the presence of and in contact with a catalyst comprising as an essential component a chromite of a metal which forms a hydrogenating metal oxide.

In practicing the invention an apparatus is used consisting essentially of an acetylene purification train, an acid vaporizer, a reactor tube provided with thermocouples for close temperature control and jacketed with a boiling liquid bath, and a system of receivers. The reactor tube is charged with the appropriate amount of catalyst, e. g., zinc-cadmium chromite, and the liquid bath brought to the desired reaction temperature. After the system has been carefully purged with nitrogen, acetylene is passed into the vaporizer, which is maintained at a temperature above the boiling point of the acid. Acid is dropped into the vaporizer at a rate measured to give a space velocity of 500 volumes of gas per unit volume of catalyst per hour and a molecular ratio of acetylene to acid of 3:1. An exothermic reaction occurs and during the course of the reaction the temperature of the catalyst bed rises to 230° to 235° C. and remains 10° to 30° C. above the heating bath temperature. The reaction products are collected and the vinyl ester separated from the unchanged acid by distillation.

By "space velocity" is meant the rate at which the gaseous reactants pass through the catalyst and is defined as the number of volumes of gas, calculated at standard conditions, that traverse one volume of catalyst during one hour.

The more detailed practice of the invention is illustrated by the following examples. There are of course many forms of the invention other than these specific embodiments.

Example I

A selective, efficient mixed chromite catalyst for the process is prepared according to the following procedure: A solution of ammonium dichromate, prepared by adding 504 grams of ammonium dichromate to 270 grams of 28.5% ammonia and making up to 2 liters with water, is slowly introduced with constant stirring into a solution of 980 grams of zinc nitrate hexahydrate, 123 grams of cadmium nitrate tetrahydrate, and 81 grams of mercuric chloride dissolved in 3 liters of water. The solution is adjusted to a pH of 7.1–7.2 by the further addition of 305 cc. of 28.5% ammonia. The precipitate is washed by decantation, filtered with suction, dried at 110° C. and ignited at 400° C., whereupon the mixed chromates are decomposed to form the chromites. The black powder is granulated by mixing with water, dried, and briquetted in a tablet machine after addition of 2% graphite which serves as a die lubricant. The mol percent composition of the catalyst is 82.5% zinc, 10% cadmium, and 7.5% mercury.

A reactor tube is charged with 25 cc. of the above zinc-cadmium-mercury chromite and the tube and contents heated to 175° C. by means of an electrically heated "Dowtherm" bath. After the reaction system is thoroughly purged with nitrogen, acetylene is passed through the tube at the rate of 10.7 grams per hour. Liquid glacial acetic acid is introduced into the acetylene stream at a uniform rate of 8.1 grams per hour. The acetic acid is vaporized in an electrically heated vaporizer flask and swept into the reactor tube by the acetylene. Under these conditions the space velocity is 500 volumes of gas per unit volume of catalyst per hour, the contact time is 4 to 5 seconds and the molar ratio of acetylene to acetic acid is 3:1. A slightly exothermic reaction occurs and titration of a sample of the reaction product with N/3 sodium hydroxide indicates that 70% of the acetic acid is unchanged. Distillation of the reaction product gives vinyl acetate, B. P. 72° C., and acetic acid suitable for recycling. There is a 24 per cent conversion to vinyl acetate, based on the acetic acid processed. A small amount of residue remains after distillation, but no ethylidene diacetate (B. P. 188° C.) or other by-product was isolated.

*Example II*

When the above process is duplicated in all details, except that a higher reaction temperature is maintained by means of a boiling trichlorobenzene bath, B. P. 215° C., a more pronounced exothermic reaction occurs with the catalyst bed temperature remaining constant at 228° to 229° C. for the duration of the run. From 106.8 grams of acetic acid processed during 13.5 hours there is obtained 125.6 grams of crude product from which there are isolated 95.3 grams of vinyl acetate, B. P. 72° C., and 23.7 grams of unchanged acetic acid. This represents a 63 per cent conversion to vinyl acetate based on the acetic acid processed. No ethylidene diacetate is obtained in the distillation of the crude reaction product.

*Example III*

Twenty-five cc. of a zinc-cadmium-chromite catalyst containing 90 mol per cent of zinc and 10 mol per cent of cadmium, prepared in a manner similar to that of the catalyst described in Example I, is charged into the reactor tube and heated by means of a jacket containing trichlorobenzene boiling at 215° C. Acetylene flowing at a rate of 10.7 grams per hour is mixed with 8.1 grams per hour of acetic acid vapor and passed over the catalyst at a space velocity of 500 volumes of gas per unit volume of catalyst per hour and at a time of contact of 4 to 5 seconds. From 112 grams of acetic acid, processed during 13.6 hours, there is obtained 111 grams of vinyl acetate which represents a conversion of 70 per cent of theory, based on the acetic acid processed.

*Example IV*

Eleven grams per hour of n-butyric acid is vaporized and passed with 10.7 grams per hour of acetylene over 25 cc. of the zinc-cadmium-chromite catalyst of Example III. The reaction is carried out at a liquid bath temperature of 220° to 224° C., maintained by an electrically heated "Dowtherm" bath, and at a space velocity of 400 volumes of gas per unit volume of catalyst per hour. Forty-four grams of n-butyric acid are processed in 4 hours during which time 51 grams of crude product is produced and distilled to give 29 grams of vinyl n-butyrate, B. P. 115° to 116° C., and 18 grams of n-butyric acid. This represents a 51 per cent conversion to vinyl ester based on the acid processed.

*Example V*

Fifteen grams of diethylacetic acid is vaporized and passed with 10.7 grams of acetylene into a reaction tube containing 25 cc. of zinc-cadmium-mercury chromite catalyst. The reactor tube is jacketed with a liquid bath heated by means of an electric coil heater. The entire system is purged with nitrogen while bringing the bath temperature to 230° C. Upon passing the mixed vapors into the reaction zone at a space velocity of 500 volumes of gas per unit volume of catalyst per hour there is an exothermic reaction, the temperature of the catalyst zone rising to 236° C. Over a period of 3 hours of operation 45 grams of diethylacetic acid is processed and distillation gives 26 grams of vinyl diethylacetate, B. P. 147° C., which represents a conversion of 50 per cent of theory, based on the acid processed.

*Example VI*

Fifty cc. of zinc-cadmium chromite pellets (32.5% Zn, 5.6% Cd, 27.1% Cr) is charged into a reactor tube and heated by means of a jacket containing trichlorobenzene boiling at 213° C. Acetylene flowing at a rate of 11.6 grams per hour is mixed with 34.1 grams per hour of acetic acid and passed over the catalyst at a space velocity of 455 cc. of gas per cc. of catalyst per hour with an acetylene to acetic acid molar ratio of 1 to 1.273. The product contains 46.5 per cent vinyl acetate equivalent to a yield of 23.4 pounds of vinyl acetate per cubic foot of catalyst per hour. This yield represents a 48.8 per cent conversion of the acetylene to vinyl acetate.

*Example VII*

Fifty cc. of zinc-cadmium chromite pellets having the composition of the catalyst of Example VI is heated in a reactor by means of a jacket containing trichlorobenzene boiling at 214° C. Acetylene flowing at a rate of 19.32 grams per hour is mixed with 21.28 grams per hour of acetic acid and passed over the catalyst at a space velocity of 492 cc. of gas per cubic centimeter of catalyst per hour with a molar ratio of acetylene to acetic acid of 2.09 to 1. The product contains 71.8 per cent vinyl acetate equivalent to a yield of 25.5 lbs. of vinyl acetate per cubic foot of catalyst per hour. This represents a 65 per cent conversion of the acetic acid to vinyl acetate.

*Example VIII*

Fifty cubic centimeters of zinc-cadmium chromite pellets having the composition set forth in Example VI, is heated in a reactor by means of a jacket containing trichlorobenzene boiling at 214° C. Acetylene flowing at a rate of 14.49 grams per hour is mixed with 30.38 grams per hour of acetic acid and passed over the catalyst at a space velocity of 480 cc. of gas per cc. of catalyst per hour with a molar ratio of acetylene to acetic acid of 1.082 to 1. The product contains 60.4 per cent vinyl acetate equivalent to a yield of 30 lbs. of vinyl acetate per cu. ft. of catalyst per hour. This represents a 54.1 per cent conversion of the acetic acid to vinyl acetate.

*Example IX*

Four hundred cc. of zinc-cadmium chromite pellets, of the composition set forth in Example VI, is heated in a reactor in a bath at 211° C. which is gradually raised to 236° C. over a period of 138 hours. Acetylene and acetic acid in a molar ratio of 1 to 1.2 are fed in at a space velocity of 100 cc. of gas per cc. of catalyst per hour. The product averages 54 per cent vinyl acetate, equivalent to a yield of 6 lbs. of vinyl acetate per cu. ft. of catalyst per hour. This represents a 55 per cent conversion of the acetylene to vinyl acetate. The complete analysis of a sample of crude product withdrawn after the 50th hour of synthesis is as follows:

|  | Per cent |
|---|---|
| Vinyl acetate | 68.9 |
| Acetic acid | 24.8 |
| Acetaldehyde | 2.8 |
| Acetone | 3.1 |
| Water | 0.13 |
| Ethylidene diacetate | 0.35 |
| Total | 100.08 |

Example X

Fifty cc. of zinc-cadmium chromite pellets of the composition set forth in Example VI, is heated in a reactor in a bath at 214° C. Acetylene flowing at a rate of 5.28 grams per hour is mixed with 15.58 grams per hour of acetic acid and passed over the catalyst at a space velocity (at N. T. P.) of 207 cc. of gas per cc. of catalyst per hour with a molar ratio of acetylene to acetic acid of 1 to 1.28. The product contains 79.5 per cent vinyl acetate equivalent to a yield of 21.1 lbs. of vinyl acetate per cu. ft. of catalyst per hour. This represents a 97.3 per cent conversion of the acetylene to vinyl acetate.

Example XI

Fifty cc. of zinc chromite pellets is charged into a reactor tube and heated in a bath of ethylpolychlorobenzene refluxing under a partial vacuum at 238° C. Acetylene flowing at a rate of 14.49 grams per hour is mixed with 30.8 grams per hour of acetic acid and passed over the catalyst at a space velocity of 478 cc. of gas per cc. of catalyst per hour with a molar ratio of acetylene to acetic acid of 1.095 to 1. The product contains 62.9 per cent vinyl acetate equivalent to a yield of 32.0 lbs. of vinyl acetate per cu. ft. of catalyst per hour. This represents a 58.4 per cent conversion of the acetic acid to vinyl acetate.

The catalysts may advantageously contain a binder as illustrated in Examples XII, XIII, and XIV, below.

Example XII 0.76 cubic foot of zinc-cadmium chromite (31.12% Zn, 7.78% Cd, 28.0% Cr) pellets containing 2 per cent ammonium dihydrogen phosphate binder is heated in a bath at 190° to 220° C. Acetylene and acetic acid are introduced at a space velocity of about 100 cu. ft. of gas per cu. ft. of catalyst per hour. The product averages 45 per cent vinyl acetate over a period of 95 hours or 4 lbs. of vinyl acetate per cu. ft. of catalyst per hour. The catalyst is reactivated by steaming at 223° C. for 3½ hours and burning for 106 hours. The synthesis is then continued for about 100 hrs. at a space velocity of 100 cu. ft. of gas per cu. ft. of catalyst per hour, and 45 hours at a space velocity of 200 cu. ft. of gas per cu. ft. of catalyst per hour, with a molar ratio of acetylene to acetic acid of 1.2 to 1. The product at the lower space velocity averages 60 per cent vinyl acetate or a 55 per cent conversion of the acetic acid to vinyl acetate. At the higher space velocity the product averages 37 per cent vinyl acetate or a 30 per cent conversion of acetic acid to vinyl acetate. These are both equal to a yield of 6 lbs. of vinyl acetate per cu. ft. of catalyst per hour. The catalyst is again reactivated by steaming for 10 hours and burning for 20 hours. The synthesis is continued at a space velocity of 200 for 217 hours and an average yield of 8.3 lbs. of vinyl acetate per cu. ft. of catalyst per hour is obtained. Thus, the catalyst has been used for a total of 457 hours and yields 2,320 lbs. of vinyl acetate. The catalyst is reactivated for a third time, and initial yields of 10 to 11 pounds of vinyl acetate per cu. ft. of catalyst per hour are obtained at a space velocity of 200 with a molar ratio of acetylene to acetic acid of 1.1 to 1.

The above example also illustrates the striking increase in yield after reactivation. The addition of a binder to the catalyst prevents chalking and spalling during the synthesis and disintegration during the reactivation cycle.

Example XIII

Fifty cubic centimeters of zinc-cadmium chromite pellets containing 2 per cent boric acid binder, added during granulation, is heated in a bath at 218° C. Acetylene flowing at a rate of 14.49 grams per hour is mixed with 31.6 grams per hour of acetic acid and passed over the catalyst at a space velocity (at N. T. P.) of 485 cc. of gas per cc. of catalyst per hour with a molar ratio of acetylene to acetic acid of 1.06 to 1. The product contains 47.8 per cent vinyl acetate equivalent to a yield of 22.0 lbs. of vinyl acetate per cu. ft. of catalyst per hour. This represents a 38.9 per cent conversion of the acetic acid to vinyl acetate.

Example XIV

Fifty cc. of zinc-cadmium chromite pellets containing 1 per cent sodium silicate binder, added during granulation, is heated in a bath at 215° C. Acetylene flowing at a rate of 14.49 grams per hour is mixed with 36.78 grams per hour of acetic acid and passed over the catalyst at a space velocity of 525 cc. of gas per cc. of catalyst per hour with an acetylene to acetic acid molar ratio of 1 to 1.1. The product contains 37.1 per cent vinyl acetate equivalent to a yield of 19.3 lbs. of vinyl acetate per cu. ft. of catalyst per hour. This represents a 32.2 per cent conversion of the acetylene to vinyl acetate.

The catalysts employed in Examples XIII and XIV are reactivated by steaming and burning and similar yields of vinyl acetate are obtained. After the reactivation and second period of synthesis the catalyst still consists of firm and coherent pellets and is in better physical condition than the catalyst containing no binder. While, as shown in the examples, the catalyst containing no binder stands up for well over 125 hours, the use of a binder greatly increases the useful life of the catalyst under the reaction conditions.

Example XV

Four hundred cc. of 1/8" diameter pellets of zinc cadmium mercury chromite of 1.57 grams per cubic centimeter bulk density is heated in a reactor bath at 215° C. which is gradually raised to 260° C. during a period of 84.5 hours. Acetylene and acetic acid in a molar ratio of 1 to 1 are fed in at a calculated space velocity (N. T. P.) of 500 cc. of gas per cubic centimeter of catalyst per hour. The crude product contains an average of 22% vinyl acetate equivalent to a yield of 11.0 pounds of vinyl acetate per cubic foot of catalyst per hour. This represents a 20.9% conversion of the reactants to vinyl acetate.

The foregoing examples have illustrated the catalytic condensation of acetylene and organic carboxylic acids to produce vinyl esters under definite conditions of temperature, pressure, gas velocity, concentrations of materials, duration of the reaction and the like. It should be understood, however, that these figures may be subject to wide variations without departing from the scope of the invention.

In general the process of this invention is operated at temperatures in the range of 100° to 350° C. and at atmospheric pressure. To insure a practical rate of reaction, however, it is in some instances desirable and beneficial to carry out the reaction under superatmospheric pressures. It is preferred, however, to operate at temperatures above the boiling point of the acid, under which conditions the reaction proceeds smoothly at atmospheric pressure. The upper temperature limit at which this process is operable is determined by the thermal stability of the compounds involved. The use of temperatures within the range of from about 200° C. to about 350° C. is preferred as is also atmospheric pressure. The actual values selected within the preferred ranges of temperatures are dependent upon the properties of the acid and the activity of the catalyst. It is preferable to operate at a temperature high enough to maintain the acid in a vaporous condition during contact with the catalyst and also to operate at a temperature at which the efficiency of the catalyst approaches a maximum as indicated by an exothermic effect within the catalyst bed.

An alternative to prevaporizing the acid, which is especially applicable to high boiling acids, is to admix the acid with the acetylene and permit the mixture to flow concurrently or countercurrently with the acetylene through the heated catalyst bed.

The acetylene and carboxylic acid vapor mixture can be passed through the reaction chamber in equimolecular proportions or with either component in excess. From the standpoint of economy of raw materials it is preferred to operate at an acetylene to acid molecular ratio within the range of 0.5 to 3.0. It is also advantageous to operate at a molecular ratio of components which will provide the most efficient utilization of one of the components and thus simplify recyclization of the component in excess.

The catalysts of this invention are selective for the formation of vinyl esters in high conversions per pass and do not favor the formation of appreciable amounts of ethylidene ester by a secondary reaction between the vinyl ester and the acetylene. Hence, the space velocities of the mixed vapors and the relative proportions of these reactants are not so critical for obtaining high conversion as with the other catalysts of the art. The prior art catalysts, lacking the desired selectivity, give major quantities of by-product unless high space velocities or an excess of one of the components is used. Thus, it is necessary to sacrifice a high conversion of vinyl ester and complete clean-up of either of the reactants in order to retard this secondary reaction.

In the process of the present invention there may be employed as a catalyst any chromite of a metal which forms a hydrogenating metal oxide which oxide is difficultly reducible since it is very effective in inhibiting side reaction product formation. The chromium oxide is in chemical association with the hydrogenating metal oxide, e. g., in the form of a chromite. Particularly good results are obtained by using as the catalyst mixtures of chromites of metals which form hydrogenating metal oxides at least one of which is difficultly reducible and another readily reducible. The preferred compositions comprise zinc chromite associated with a lesser quantity of cadmium chromite or lesser quantities of the chromites of cadmium and mercury, since these are relatively immune to degenerative processes such as sintering and poisoning, and are highly selective and active for vinyl ester formation. The invention contemplates the use of various combinations or mixtures of these chromites in widely varying proportions of the respective constituents.

Difficultly reducible oxides are those which remain for the most part in the oxide form after prolonged exposure in a pure state to hydrogen at atmospheric pressure and at a temperature of 400° C., and hydrogenating metals whose oxides are included in this category are zinc, magnesium, and manganese. Readily reducible oxides are those which, under the same conditions, are readily converted to the elementary metal and water vapor. Any hydrogenating metal whose oxide is readily reducible, including cadmium, mercury, copper, silver, tin, lead, bismuth, iron, cobalt, and nickel, may be employed. Thus, there may be employed zinc chromite, zinc-cadmium chromite, zinc-cadmium-mercury chromite, copper-cadmium-zinc chromite, copper-zinc chromite, lead-zinc chromite, bismuth-manganese chromite, copper-magnesium chromite, lead-manganese chromite, zinc-manganese chromite, iron-manganese chromite, etc.

Chromite catalysts prepared by any of the known methods which will give a catalytically active substance may be used in this process. The method described in Example I for the preparation of zinc-cadmium-mercury chromite is generally applicable to the preparation of the simple or mixed chromites employed herein. This method consists essentially of co-precipitating multiple chromates of the non-reducible and reducible oxides with ammonium chromate and decomposing by heating at 400° C. the multiple ammonium chromates. Salts such as chlorides or sulfates may be used in place of the nitrates. It is advisable to wash the mixed chromates thoroughly with water until a negative test for the chloride or sulfate ion is obtained.

The chromite catalysts of the invention may be used in the massive state or may be supported on porous carriers as kieselguhr, pumice, silica, alumina, asbestos, and the like.

In order to prevent chalking and disintegration of the chromite catalysts of this invention during the synthesis and catalyst reactivation process it is beneficial to add small amounts of binders such as ammonium hydrogen phosphate, boric acid, silicic acid, and the like.

The process of this invention is generically applicable to acetylenes of the type $RC \equiv CR'$ where R and R' are hydrogen or any saturated or unsaturated hydrocarbon radical. As typical examples of acetylenes for the reaction are: acetylene, monovinylacetylene, divinylacetylene, allylene, butyne-1, 3-octene-1-yne, 1-pentene-3-yne, and the like which condense with carboxylic acids to form substituted or unsubstituted vinyl-type esters.

This process is not limited to the particular carboxylic acids illustrated in the foregoing examples, but is generally applicable to carboxylic acids. While saturated fatty monocarboxylic acids of the formula $C_nH_{2n+1}COOH$, e. g. acetic, n-butyric, diethylacetic acids, propionic, isobutyric, caproic, lauric, stearic, palmitic, pelargonic, capric, and arachidic acids are preferred because the process therewith has greater freedom from side reactions, the invention is generically applicable to carboxylic acids including:

Substituted monocarboxylic acids, e. g., cysteine, methoxyacetic, phenyl acetic, phenylglycine, chloroacetic, trichloroacetic, pyruvic, thioglycolic, trimethylacetic, and meththioglycolic acids;

Unsaturated monocarboxylic acids, e. g., acrylic, methacrylic, crotonic, cinnamic, oleic, linoleic, and undecylenic acids;

Cyclic monocarboxylic acids, e. g., benzoic, toluic, salicylic, furoic, pyridinecarboxylic, and quinolinecarboxylic acids;

Polycarboxylic acids, e. g., succinic, maleic, fumaric, pimelic, glutaric, adipic, and phthalic acids.

The vinyl esters of this invention are extremely valuable organic compounds which are particularly useful in the manufacture of resins and synthetic film-forming polymers. The products have applications in various fields. Thus, vinyl phthalate is of use as an anchoring coating for moistureproofing Cellophane sheeting, vinyl thioglycolate as an intermediate in preparing cross-linked polymers, vinyl esters of aminoacids as intermediates for film-forming polymers and for polymeric materials for regenerating cellulose or cellulosic derivatives. Vinyl glycolate and phthalate may be used in the preparation of water soluble resins and vinyl esters of 8–12 carbon acids in producing polymeric materials possessing elastic properties resembling vulcanized rubber. In general, the vinyl esters display outstanding usefulness as intermediates in the fields of film-forming polymers, resin modifying agents, dispersing agents, fabric finishing agents, rubber substitutes, insecticides, and related fields.

The catalysts of this invention are of advantage in that they are of long life and high activity. While other vapor phase catalysts such as zinc acetate are effective in catalyzing the esterification of acetylene with acetic acid their life is very short. Thus, while the initial conversions are of the order of 80%, after only 10 to 15 hours the conversion drops to about 15%. With the chromite catalysts of the present invention activity is unchanged even after 125 hours of use. The initial conversions with the preferred zinc-cadmium chromite catalyst are of the order of about 70% and this remains substantially unchanged even after 125 hours of use. When the catalysts are prepared containing binders as in Examples XII–XIV above, the catalysts have total effective lives far exceeding this figure.

The above description and examples are intended to be illustrative only. Any modification of or variation therefrom which conforms to the spirit of the invention is intended to be included within the scope of the claims.

I claim:

1. In a process for the preparation of esters from acetylene and a saturated fatty monocarboxylic acid of the formula $C_nH_{2n+1}COOH$, wherein $n$ is an integer from 1 to 5, the improvement which comprises bringing the acetylene and the carboxylic acid at an acetylene/acid ratio of 0.5/1 to 3.0/1, at a temperature in the range of 100–350° C., and in the vapor phase in contact with zinc chromite.

2. In a process for the preparation of esters from acetylene and a saturated fatty monocarboxylic acid of the formula $C_nH_{2n+1}COOH$, wherein $n$ is an integer from 1 to 5, the improvement which comprises bringing the acetylene and the carboxylic acid at an acetylene/acid ratio of 0.5/1 to 3.0/1, at a temperature in the range of 100–350° C., and in the vapor phase in contact with zinc chromite intimately admixed with the chromite of a hydrogenating metal whose oxide is easily reducible and which is selected from the class consisting of cadmium and mercury.

3. In a process for the preparation of vinyl acetate from acetylene and acetic acid, the improvement which comprises bringing the acetylene and the carboxylic acid at an acetylene/acid ratio of 0.5/1 to 3.0/1, at a temperature in the range of 100–350° C., and in the vapor phase in contact with zinc chromite.

4. In a process for the preparation of vinyl acetate from acetylene and acetic acid, the improvement which comprises bringing the acetylene and the carboxylic acid at an acetylene/acid ratio of 0.5/1 to 3.0/1, at a temperature in the range of 100–350° C., and in the vapor phase in contact with zinc chromite intimately admixed with the chromite of a hydrogenating metal whose oxide is easily reducible and which is selected from the class consisting of cadmium and mercury.

5. In a process for the preparation of vinyl acetate from acetylene and acetic acid, the improvement which comprises bringing the acetylene and the carboxylic acid at an acetylene/acid ratio of 0.5/1 to 3.0/1, at a temperature in the range of 100–350° C., and in the vapor phase in contact with zinc chromite admixed with cadmium chromite.

6. In a process for the preparation of vinyl acetate from acetylene and acetic acid, the improvement which comprises bringing the acetylene and the carboxylic acid at an acetylene/acid ratio of 0.5/1 to 3.0/1, at a temperature in the range of 100–350° C., and in the vapor phase in contact with zinc chromite admixed with cadmium chromite and mercury chromite.

WILLIAM VANCE FREED.

Certificate of Correction

Patent No. 2,411,962. December 3, 1946.

WILLIAM VANCE FREED

It is hereby certified that error appears in the printed specification of the above numbered patent requiring correction as follows: Column 7, line 70, before "chromites" insert the words *two or more*; and that the said Letters Patent should be read with this correction therein that the same may conform to the record of the case in the Patent Office.

Signed and sealed this 1st day of April, A. D. 1947.

[SEAL]

LESLIE FRAZER,
*First Assistant Commissioner of Patents.*